US00RE49139E

(19) United States
(12) Reissued Patent
Nguyen

(10) Patent Number: US RE49,139 E
(45) Date of Reissued Patent: Jul. 19, 2022

(54) SWIMMING AID DEVICE

(71) Applicant: Nguyenovation Incorporated, Huntington Beach, CA (US)

(72) Inventor: Andrew Nguyen, Huntington Beach, CA (US)

(73) Assignee: Nguyenovation Incorporated, Huntington Beach, CA (US)

(21) Appl. No.: 16/722,874

(22) Filed: Dec. 20, 2019

Related U.S. Patent Documents

Reissue of:
(64) Patent No.: 9,855,464
Issued: Jan. 2, 2018
Appl. No.: 15/257,848
Filed: Sep. 6, 2016

U.S. Applications:
(63) Continuation-in-part of application No. 14/688,796, filed on Apr. 16, 2015, now Pat. No. 9,433,825.

(51) Int. Cl.
*A63B 31/11* (2006.01)

(52) U.S. Cl.
CPC ..... *A63B 31/11* (2013.01); *A63B 2209/00* (2013.01); *A63B 2210/50* (2013.01)

(58) Field of Classification Search
CPC ..... A63B 31/11; A63B 31/00; A63B 31/10; A63B 31/12; A63B 31/08; A63B 2031/112; A63B 2031/115; A63B 2031/117; A63B 69/12
See application file for complete search history.

(56) References Cited

U.S. PATENT DOCUMENTS

| | | | | |
|---|---|---|---|---|
| 3,165,764 | A | 1/1965 | Christiansen | |
| 3,521,312 | A | 7/1970 | Ganev | |
| 3,521,637 | A | 7/1970 | Ganev | |
| 4,781,637 | A | 11/1988 | Caires | A63B 31/10 441/61 |
| 5,429,536 | A * | 7/1995 | Evans | A63B 31/11 441/64 |
| 6,224,443 | B1 * | 5/2001 | Mehrmann | A63B 31/11 441/64 |
| 7,510,453 | B2 | 3/2009 | Nguyen | |
| 2005/0118904 | A1 * | 6/2005 | Belloni | A63B 31/11 441/64 |
| 2009/0053947 | A1 * | 2/2009 | Nguyen | A63B 31/11 441/64 |
| 2018/0043214 | A1 * | 2/2018 | Beittel | A63B 31/08 |
| 2019/0336829 | A1 * | 11/2019 | de Grasse | A63B 31/11 |

* cited by examiner

*Primary Examiner* — Patricia L Engle
(74) *Attorney, Agent, or Firm* — Knobbe, Martens, Olson & Bear, LLP

(57) ABSTRACT

A swimming aid device in the form of a [monofi] *monofin* is contemplated. The swimming aid device may include first and second fins formed of a resilient material, each fin including an elongated internal space within a fin body, an opening leading to the elongated internal space, a fin blade coupled to and extending away from the elongated internal space, a first and second side heel connectors on opposing sides of the opening leading to the elongated internal space and sized and shaped to mate with each other, a fin blade connector and a fin blade connector receiver on the fin blade and sized and shaped to mate with each other, the combination of the first and second fins forming a monofin.

17 Claims, 6 Drawing Sheets

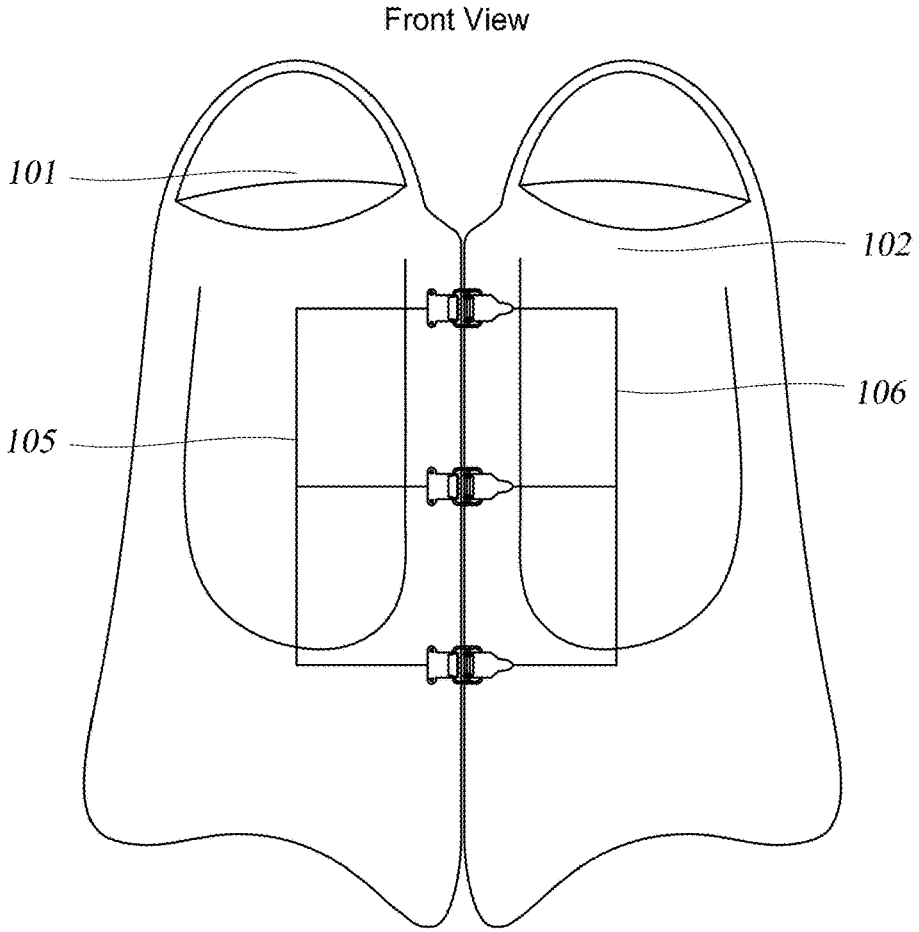
FIG. 2A
Amended
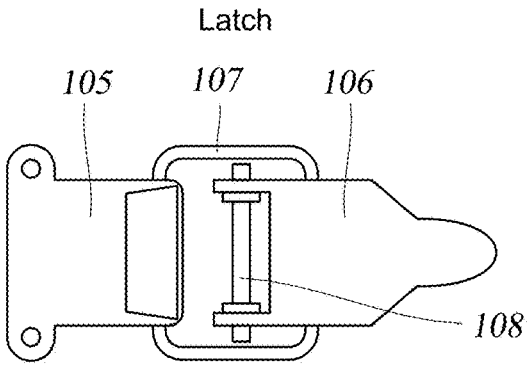
FIG. 2B
Amended
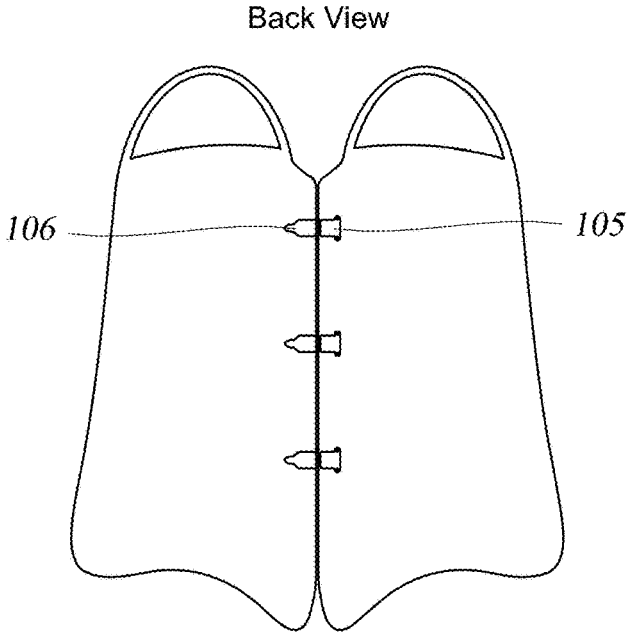
FIG. 2C
Amended

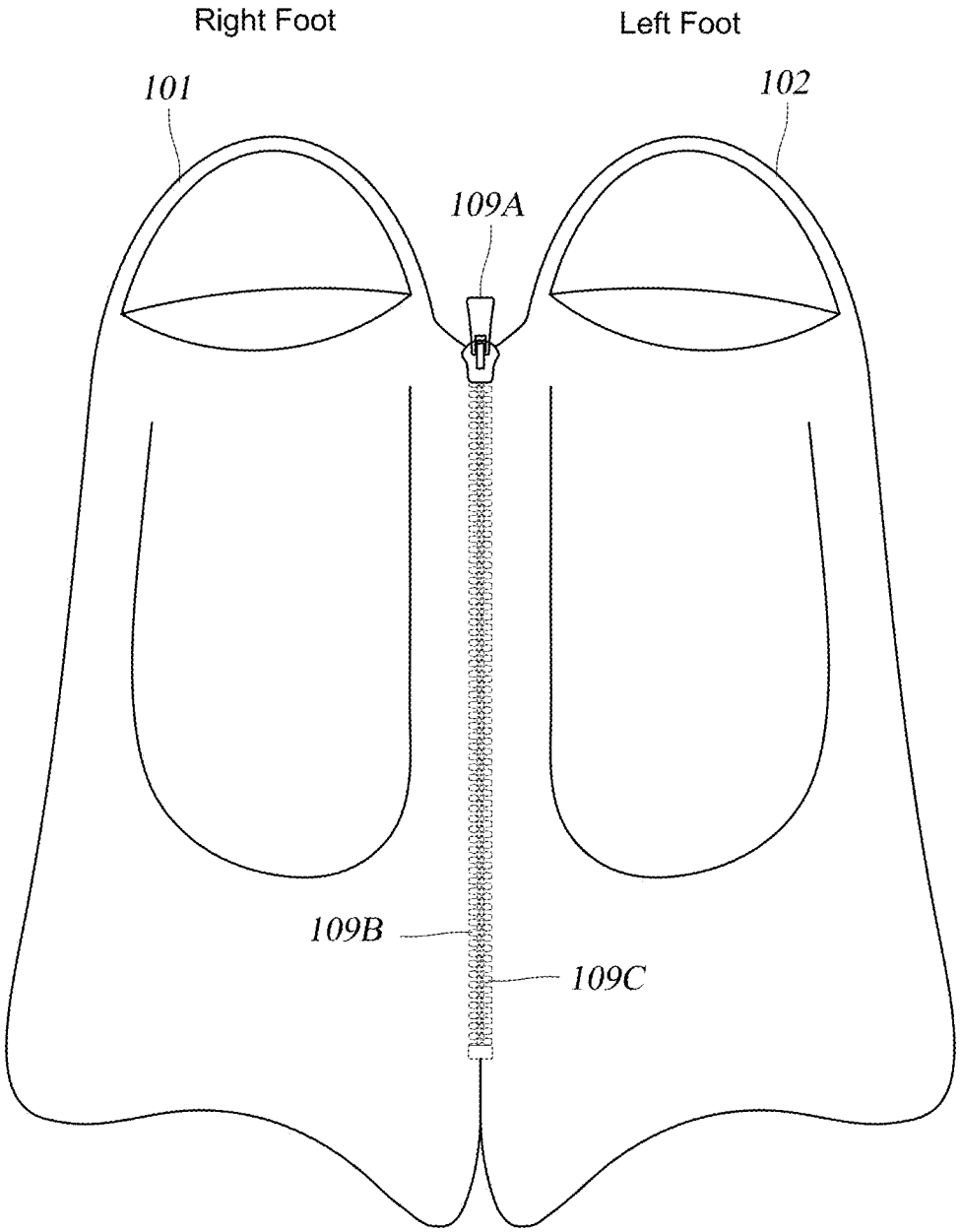
FIG. 3
Amended

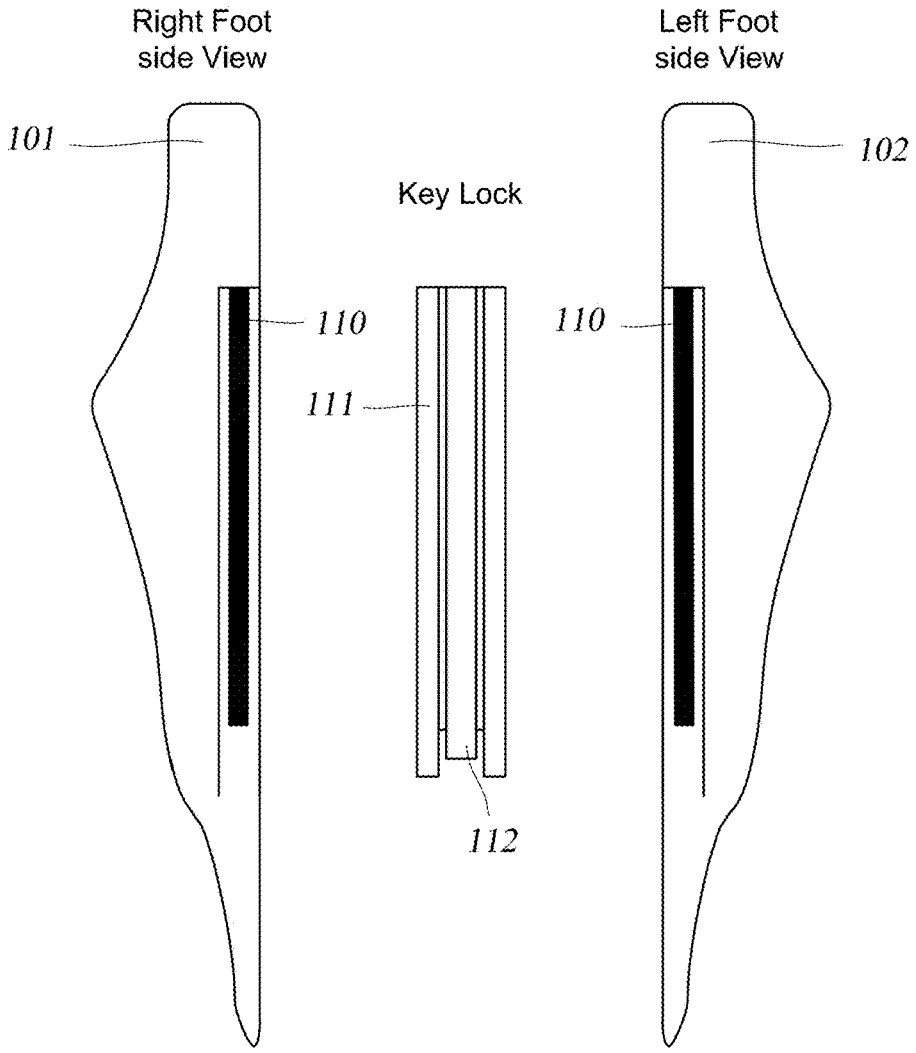
FIG. 4A
Amended
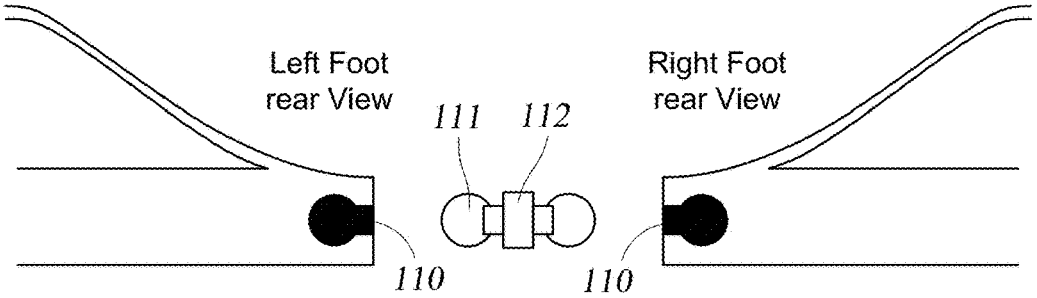
FIG. 4B
Amended

SWIMMING AID DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This is a continuation-in-part application of U.S. patent application Ser. No. 14/688,796, filed Apr. 16, 2015 and issued on Sep. 6, 2016 as U.S. Pat. No. 9,433,825, entitled "Swimming Aid Device" to Nguyen, which is incorporated herein by this reference. The structure of the swim fins disclosed in U.S. Pat. No. 7,510,453, filed Aug. 20, 2007 and issued on Mar. 31, 2009, is also incorporated herein by this reference.

BACKGROUND

1. Technical Field

Aspects of this document relate generally to swimming aids, and more particularly to swim fins.

2. Background Art

The purpose of ordinary swim fins is to provide a device for increasing speed and mobility to a swimmer with the consumption of less energy. These devices are aimed at a swimming style, which involves independent use of the legs. One style of swimming referred to as the butterfly, involves concerted use of the legs, commonly described as the dolphin kick. To maximize the efficiency, speed and power of the dolphin kick, both feet must be kept as close together as possible.

SUMMARY

According to one aspect, a swimming aid device may comprise a first fin made of resilient material, and a second fin made of resilient material, wherein each of first fin and the second fin includes an elongated internal space within a fin body, the elongated internal space sized to receive a portion of a swimmer's foot, an opening leading to the elongated internal space, the opening sized to receive a swimmer's foot at the opening, a fin blade coupled to and extending away from the elongated internal space; a groove on the fin blade, the groove forming a keyed slot, wherein the groove is made of a material harder than the fin body, and an elongated key coupled to one of the first fin and the second fin at a perimeter edge of the fin blade is slidingly engaged with the groove on the fin blade of the other of the first fin and the second fin.

Particular embodiments may comprise one or more of the following. Each of the first fin and the second fin may be identical to each other. Each of the first fin and the second fin may further comprise a left side heel connector positioned adjacent the opening leading to the elongated internal space on a left side of the respective fins, and a right side heel connector positioned adjacent to the opening leading to the elongated internal space on a right side of the respective fins, wherein the left side heel connector and the right side heel connector are sized and shaped to mate with each other. One of the left side heel connector and the right side heel connector may be a hook and the other of the left side heel connector and the right side heel connector may be a loop. For each of the first fin and the second fin, the groove may be formed on a surface of the fin blade that is not on a perimeter of the fin blade. For each of the first fin and the second fin, the elongated key may be formed on a perimeter edge of the fin blade. When the left side heel connector of one of the first and second fins is mated with the right side heel connector of the other of the first and second fins and the groove of one of the first and second fins is slidingly engaged with the elongated key of the other of the first and second fins, the elongated internal space of the first fin is angled toward the elongated internal space of the second fin. For each of the first fin and the second fin, the groove is formed on a surface of the fin blade that may not be on a perimeter of the fin blade. For each of the first fin and the second fin, the elongated key may be formed on a perimeter edge of the fin blade.

According to another aspect, a swimming aid device may comprise a first fin made of resilient material, a second fin made of resilient material, wherein each of first fin and the second fin includes an elongated internal space within a fin body, the elongated internal space sized to receive a portion of a swimmer's foot, an opening leading to the elongated internal space, the opening sized to receive a swimmer's foot at the opening, a fin blade coupled to and extending away from the elongated internal space; a first side heel connector adjacent a first side of the opening leading to the elongated internal space, a second side heel connector receiver adjacent a second side of the opening leading to the elongated internal space, wherein the first side heel connector and the second side heel connector are sized and shaped to mate with each other, a fin blade connector on the fin blade, a fin blade connector receiver on the fin blade, wherein the fin blade connector and the fin blade connector receiver are sized and shaped to mate with each other, wherein mating connection of the fin blade connector of the first fin with the fin blade connector receiver of the second fin, and mating connection of the first side heel connector of the first fin with the second side heel connector of the second fin forms a monofin of the first fin and the second fin.

Particular embodiments may comprise one or more of the following. Each of the first fin and the second fin may be identical to each other. One of the first side heel connector and the second side heel connector may be a hook and the other of the first side heel connector and the second side heel connector may be a loop. For each of the first fin and the second fin, the fin blade connector may be an elongated key and the fin blade connector receiver is a groove. For each of the first fin and the second fin, the elongated key may be formed on a perimeter of the fin blade and the groove may be formed on a surface of the fin blade that is not on a perimeter of the fin blade. When the first side heel connector of one of the first and second fins is mated with the second side heel connector of the other of the first and second fins and the groove of one of the first and second fins is slidingly engaged with the elongated key of the other of the first and second fins, the elongated internal space of the first fin may be angled toward the elongated internal space of the second fin. For each of the first fin and the second fin, the fin blade connector may be a protruding hook and the fin blade connector receiver may be an aperture extending through the fin blade. For each of the first fin and the second fin, the fin blade connector may be an elongated key and the fin blade connector receiver may be a groove. For each of the first fin and the second fin, the elongated key may be formed on a perimeter of the fin blade and the groove may be formed on a surface of the fin blade that is not on a perimeter of the fin blade.

According to yet another aspect, a method of forming a monofin may comprise providing two identical swim fins, each fin comprising first and second fins made of resilient material, each of the first and second fins comprising, an elongated internal space within a fin body, the elongated internal space sized to receive a portion of a swimmer's foot, an opening leading to the elongated internal space, the opening sized to receive a swimmer's foot at the opening, a fin blade coupled to and extending away from the elongated internal space, a first side heel connector adjacent a first side of the opening leading to the elongated internal space, a second side heel connector receiver adjacent a second side of the opening leading to the elongated internal space, wherein the first side heel connector and the second side heel connector are sized and shaped to mate with each other, a fin blade connector on the fin blade, a fin blade connector receiver on the fin blade, matingly connecting the first side heel connector of the first fin to the second side heel connector of the second fin, and matingly connecting the fin blade connector of the first fin with the fin blade connector receiver of the second fin.

Particular embodiments may further comprise matingly connecting the first side heel connector of the first fin to the second side heel connector of the second fin comprises coupling a hook connector of the first side heel connector to an eye receiver of the second side heel connector, and wherein matingly connecting the fin blade connector of the first fin with the fin blade connector receiver of the second fin comprises slidingly engaging an elongated key of the fin blade connector with a groove of the fin blade connector receiver.

Aspects, embodiments and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112, ¶6. Thus, the use of the words "function," "means" or "step" in the Detailed Description or Description of the Drawings or claims is not intended to somehow indicate a desire to invoke the special provisions of 35 U.S.C. §112, ¶6, to define the invention. To the contrary, if the provisions of 35 U.S.C. §112, ¶6 are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. §112, ¶6. Moreover, even if the provisions of 35 U.S.C. §112, ¶6 are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The inventions will hereinafter be described in conjunction with the appended drawings, where like designations denote like elements, and:

FIG. [2] *2A* is a planar view of a latch and catch coupling, *FIGS. 2B and 2C are, respectively,* a close up view and a back view of swim fins;

FIG. 3 is a planar view of a zipper coupling for a swim fin;

FIG. [4] *4A* is a side view of a sliding key and groove coupling and *FIG. 4B is* a close up view of the coupling;

FIG. 7 is a planar view of another embodiment of a single fin of a monofin pair.

DESCRIPTION

Figure 1:
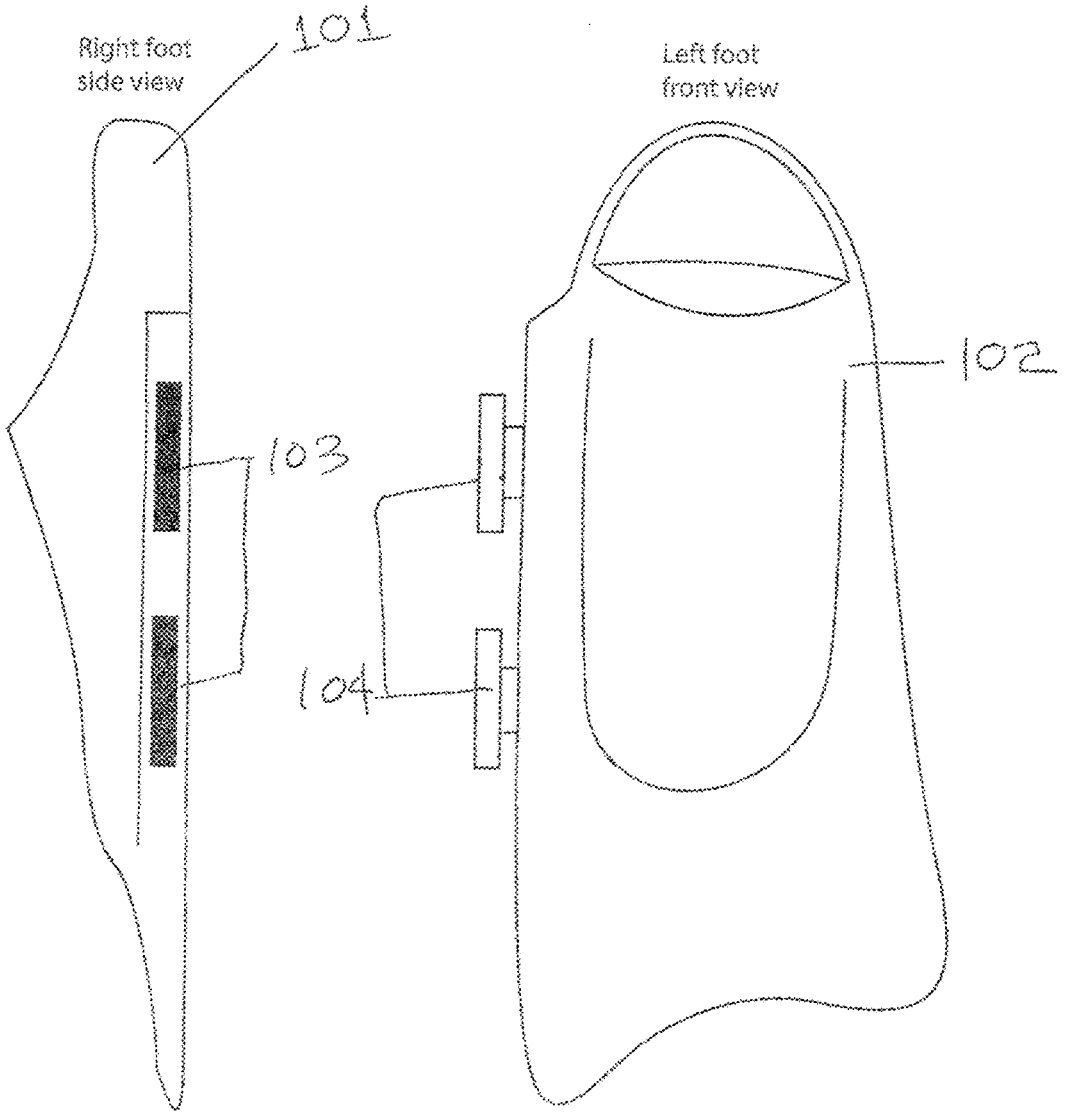
FIG. 1 is a side planar view of a peg and groove coupling for swim fins.

This disclosure, its aspects and implementations, are not limited to the specific components or assembly procedures disclosed herein. Many additional components and assembly procedures known in the art consistent with the intended swimming aids and/or assembly procedures for swimming aid will become apparent for use with implementations of swimming aids in this disclosure. Accordingly, for example, although particular swimming aids are disclosed, such swimming aids and implementing components may comprise any shape, size, style, type, model, version, measurement, concentration, material, quantity, and/or the like as is known in the art for such swimming aids and implementing components, consistent with the intended operation of swimming aids.

Particular embodiments of the swim fins in this disclosure may be used to keep both feet as close together for use as a training device for swimmers. Embodiments may be easily attached and detached to separate the fins, may be relatively easy and inexpensive to manufacture and may be modified and situated to accommodate various feet sizes of the user. Particular embodiments are relatively lightweight, durable and waterproof.

The disclosure generally relates to methods and structure for detachably coupling two swim fins. To promote longevity, particular implementations of the disclosure rely upon a more durable coupling device that has a center locking mechanism. The locking mechanism is harder and includes more plastic than the remainder of the composition of the fins. The locking mechanism has a hardness durometer scale measurement rating of at least about 90 D (hereafter "hard" or "harder") whereas the foot pocket and balance of the fins further from the locking mechanism has a hardness durometer scale measurement rating of less than about 60 D.

The coupling devices described in the first particular embodiment of FIGS. 1-4 employ a hard center locking mechanism that can removably slide between grooves in the fins, sometimes referred to as a sliding key and groove coupling. Other locking mechanisms included in the disclosure may be described as peg and groove, latch and catch, zipper, opposite polar magnets, key and lock, plate and recess, and disk and slot. Other compositions of coupling devices, such as using a metal or plastic zipper slider and teeth of corresponding materials are also included in this disclosure.

Swim fins of embodiments of this disclosure are composed of resilient material to allow for coupling and use in unison without failure due to force exerted upon the coupling. The central locking device, whether it is by sliding a locking key with corresponding grooves in the fins, peg and groove mechanism, latch and catch mechanism, zipper mechanism, opposite polar magnets with one polar magnet installed on the inner edge of each fin, sliding groove mechanism, plate and recess mechanism or disk and slot mechanism, is harder and uses more plastic with a durometer reading of at least about 90 D, as compared with the remaining composition of the foot pockets and the balance of the fins that may be made with plastic having a durometer reading of about 60 D or less.

The process for making the center locking structure harder involves making the center lock first. The center locking mechanism is made as a mold material and is injected into a mold and then allowed to harden. The center locking mechanism area may also comprise finger-like channels and reinforcing ribs throughout for added rigidity and strength, which do not appear in the remainder of the fins. The softer, more rubber-like material with a lower durometer rating is injected into the mold around the center locking mechanism.

The softer, more rubber-like material is injected around the harder center locking mechanism, which spreads into the finger-like channels to assist in creating a strong connection between the harder center locking mechanism and the body of each fin. This process will be clear to one of ordinary skill in the art of forming molded plastic and rubber components from this disclosure.

In FIG. 1, the first fin, or right foot fin 101, has at least two rectangular slots 103 that are longitudinally spaced on a lateral side nearest to the second fin, or left foot fin 102. The left fin has at least two slightly larger rectangular pegs 104 that are complementally spaced on a lateral side nearest to the right fin. When the rectangular pegs of the left fin are angled and then press fitted into the at least two slots on the right fin, they form a monofin which can later be detached. When attached, the monofin is sufficiently strong to allow a wearer to use the monofin for swimming In [FIG. 2] *FIGS. 2A, 2B, and 2C*, the right fin 101 has at least two keepers 105 that each have a permanently affixed first base. One edge of the base is backwardly curved at an edge nearest to the left fin 102. The at least two first bases on the right fin are longitudinally spaced on a side nearest to the left fin 102. The left fin 102 has at least two latches 106 each with a permanently affixed second base and each pivotally connected to rotatable lever 108 which can be raised and lowered over a range of about 180 degrees in order to extend a ring 107 which is also attached to the second base to catch on the backwardly curved edge of the affixed first base 105 on the right fin 101. The at least two latches 106 are complementally located on a lateral side nearest to the right fin 101. The latches and keepers can be closed on each other to detachable couple both fins. When closed, they form a monofin.

In FIG. 3, the right fin 101 has a zipper slider [108] *109A* mounted on a permanently affixed row of teeth *109B* on a side nearest to the left fin 102. The left fin 102 has a correspondingly, permanently affixed row of teeth *109C* on the side nearest to the right fin 101. When the zipper slider 108 is moved upwardly from the toe of the right fin, the fins are detachably joined. The monofin is sufficiently strong to allow use as a swimming device. It is further anticipated that the zipper slider may be made of metal, plastic, nylon or other material common to zippers, and the teeth will also be made of similar materials.

In [FIG. 4] *FIGS. 4A and 4B*, the right fin 101 has a longitudinal groove *110* on the side nearest the left fin 102, and the left fin has a correspondingly longitudinal groove *110* on a side nearest the right fin. A rectangular key 111 with protruding lips 112 on opposing sides can be inserted in the corresponding grooves, to detachably couple both fins. When coupled, the wearer can use the monofin as a swimming device.

Figure 5:
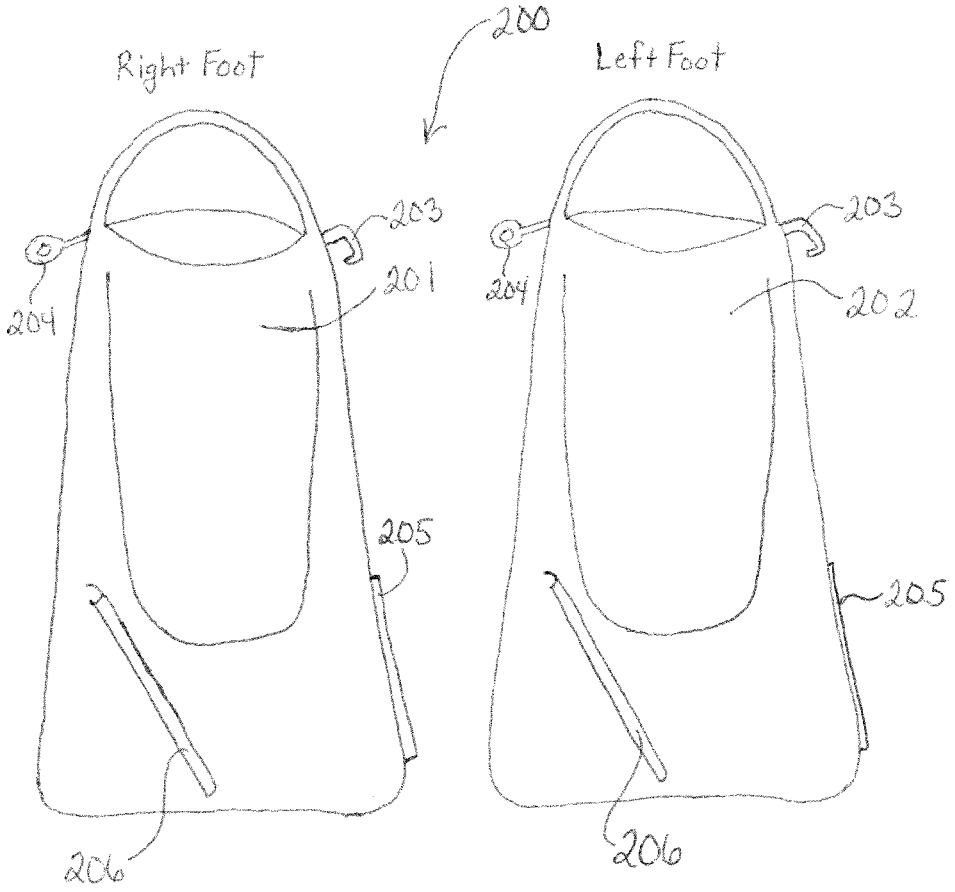
FIG. 5 is a planar view of two of the same swim fin forming a monofin pair.

In FIG. 5, another embodiment of right foot fin 201 and left foot fin 202 of a monofin pair 200 are shown. In this embodiment, both the left foot fin 201 and the right foot fin 202 are identical so that each includes not only the same parts, but both include the same parts in the same locations so that they are not mirror images of each other, as is typical with conventional fins, but are the same and could even be formed in the same mold. As illustrated, both the right foot fin 201 and the left foot fin 202 include a left side heel connector 203 and a right side heel connector receiver 204, a fin blade edge 205 and a fin blade groove or receiver 206. Although particular connectors 203, 204 for the heels, and particular connectors 205, 206 for the fin blade are shown, it is contemplated that any style of connector may be used or substituted for those shown in the figures, and in particular any of the other styles of connectors disclosed elsewhere in this disclosure. In particular, the left side heel connector 203 and the right side heel connector 204 are designed to mate with each other to hold the heel of the right foot fin 201 to the heel of the left foot fin 202. It is not critical whether the receiving side of that connector pair is on the left side or right side of the heel, but it is useful to have the connectors placed adjacent to the location where the wearer's heels will be positioned when wearing the fins. The fin blade edge 205 and fin blade groove or receiver 206 are shown in FIG. 5 with the edge 205 portion of the connector on the left side of the fin blade, and the groove or receiver 206 angled right to left on the surface of the fin right of center. These connector parts can also be swapped in their respective positioning and angles with equal effectiveness (by placing the fin blade edge 205 portion of the connector on the right side of the fin blade and the groove or receiver 206 angled left to right on the surface of the fin left of center). *As illustrated, the fin blade connectors 205, 206 can extend less than half of a total length of each fin.*

Figure 6:
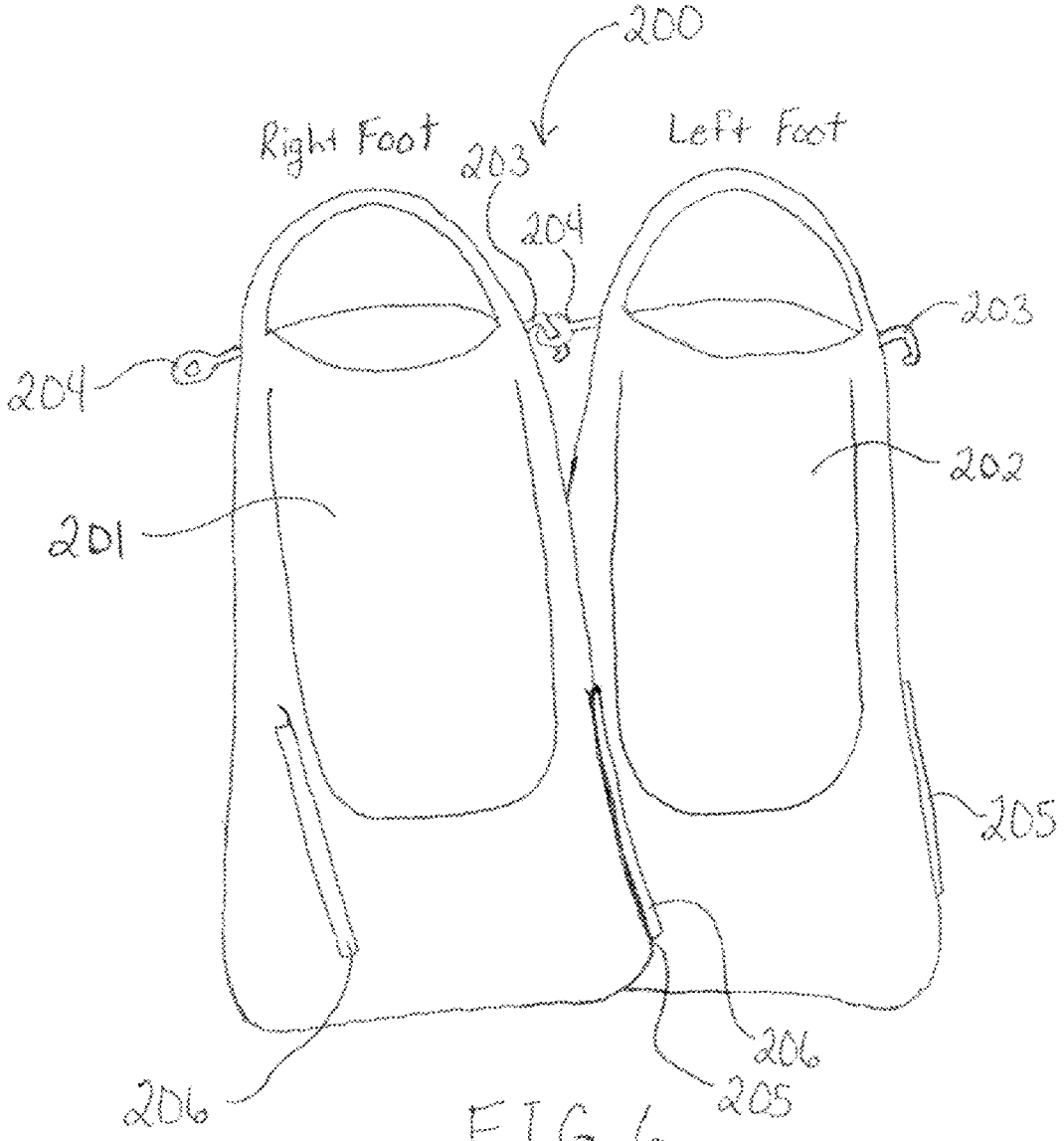
FIG. 6 is a planar view of the monofin pair of FIG. 5 with the fins attached.

As illustrated in FIG. 6, by joining the heel connectors 203, 204 together, and joining the fin blade connectors 205, 206 together, the two separate fins form a monofin. Different from previous embodiments, however, this monofin is formed of two fins that are not unique to a left or right foot and can be interchanged, and allows the user's fins to overlap which separates the wearer's heels a little and allows the wearer's toes to angle toward each other for comfort when using a dolphin kick style of swimming Like with the materials used for forming the locking mechanisms of previous embodiments, the locking mechanisms, or connectors, of the embodiments of FIGS. 5-7 similarly may be formed of materials having a hardness durometer scale measurement rating of at least about 90 D (hereafter "hard" or "harder") whereas the foot pocket and balance of the fins further from the locking mechanisms, or connectors, may have a hardness durometer scale measurement rating of less than about 60 D. Use of a harder material for forming the locking mechanisms or connectors allows the body and pocket of the fins to be comfortable while allowing the locking mechanisms, or connectors, to maintain the connection between the left and right fins even if the wearer is not using a uniform dolphin kick so that the wearer does not unintentionally disconnect the two fins from each other. Also, as with all of the embodiments of this disclosure, the fins are effective as separate fins 201, 202 as well as being effective as a monofin pair 200 when combined.

FIG. 7 illustrates another particular embodiment of a single fin 210 of a monofin pair comprising left and right heel connectors 203, 204 and both an extending 212 and a receiving 211 fin blade connectors. In use, rather than inserting a fin blade edge into a groove or receiver on the corresponding fin blade of the monofin pair 200 as in the embodiment of FIGS. 5 and 6, the extending fin blade connector 212 may be received into the receiving fin blade connector 211 on a corresponding fin blade of a monofin pair. In the particular embodiment of FIG. 7, the fin blade connector 212 is hook shaped and the fin blade connector receiver 211 is an aperture extending through the fin blade. Those of ordinary skill in the art will readily be aware of other forms and styles of connectors suitable for various applications from this disclosure.

The invention claimed is:

1. A swimming aid device, comprising:
a first fin made of resilient material; and
a second fin made of resilient material;
wherein each of first fin and the second fin includes:
an elongated internal space within a fin body, the elongated internal space sized to receive a portion of a swimmer's foot;
an opening leading to the elongated internal space, the opening sized to receive a swimmer's foot at the opening;
a fin blade coupled to and extending away from the elongated internal space; and
a groove on the fin blade, the groove forming a keyed slot; and
wherein the groove is made of a material harder than the fin body, and an elongated key coupled to one of the first fin and the second fin at a perimeter edge of the fin blade is slidingly engaged with the groove on the fin blade of the other of the first fin and the second fin*; and wherein for each of the first fin and the second fin, the groove is formed on a surface of the fin blade that is not on a perimeter of the fin blade.*

2. The swimming aid device of claim 1, wherein each of the first fin and the second fin are identical to each other.

3. The swimming aid device of claim 1, wherein each of the first fin and the second fin further comprises: a left side heel connector positioned adjacent the opening leading to the elongated internal space on a left side of the respective fins, and a right side heel connector positioned adjacent to the opening leading to the elongated internal space on a right side of the respective fins, wherein the left side heel connector and the right side heel connector are sized and shaped to mate with each other.

4. The swimming aid device of claim 3, wherein one of the left side heel connector and the right side heel connector is a hook and the other of the left side heel connector and the right side heel connector is a loop.

[5. The swimming aid device of claim 3, wherein for each of the first fin and the second fin, the groove is formed on a surface of the fin blade that is not on a perimeter of the fin blade.]

6. The swimming aid device of claim [5] *1*, wherein for each of the first fin and the second fin, the elongated key is formed on a perimeter edge of the fin blade.

7. The swimming aid device of claim 6, wherein when the left side heel connector of one of the first and second fins is mated with the right side heel connector of the other of the first and second fins and the groove of one of the first and second fins is slidingly engaged with the elongated key of the other of the first and second fins, the elongated internal space of the first fin is angled toward the elongated internal space of the second fin.

[8. The swimming aid device of claim 1, wherein for each of the first fin and the second fin, the groove is formed on a surface of the fin blade that is not on a perimeter of the fin blade.]

9. The swimming aid device of claim [8] *1*, wherein for each of the first fin and the second fin, the elongated key is formed on a perimeter edge of the fin blade.

10. A swimming aid device, comprising:
a first fin made of resilient material;
a second fin made of resilient material;
wherein each of first fin and the second fin includes:
an elongated internal space within a fin body, the elongated internal space sized to receive a portion of a swimmer's foot;
an opening leading to the elongated internal space, the opening sized to receive a swimmer's foot at the opening;
a fin blade coupled to and extending away from the elongated internal space;
a first side heel connector adjacent a first side of the opening leading to the elongated internal space;
a second side heel connector receiver adjacent a second side of the opening leading to the elongated internal space, wherein the first side heel connector and the second side heel connector are sized and shaped to mate with each other;
a fin blade connector on the fin blade; and
a fin blade connector receiver on the fin blade, wherein the fin blade connector and the fin blade connector receiver are sized and shaped to mate with each other;
wherein mating connection of the fin blade connector of the first fin with the fin blade connector receiver of the second fin, and mating connection of the first side heel connector of the first fin with the second side heel connector of the second fin forms a monofin of the first fin and the second fin;

*wherein one of the first side heel connector and the second side heel connector is a hook and the other of the first side heel connector and the second side heel connector is a loop;*

*wherein for each of the first fin and the second fin, the fin blade connector is an elongated key and the fin blade connector receiver is a groove; and*

*wherein for each of the first fin and the second fin, the elongated key is formed on a perimeter of the fin blade and the groove is formed on a surface of the fin blade that is not on a perimeter of the fin blade.*

11. The swimming aid device of claim 10, wherein each of the first fin and the second fin are identical to each other.

[12. The swimming aid device of claim 10, wherein one of the first side heel connector and the second side heel connector is a hook and the other of the first side heel connector and the second side heel connector is a loop.]

[13. The swimming aid device of claim 12, wherein for each of the first fin and the second fin, the fin blade connector is an elongated key and the fin blade connector receiver is a groove.]

[14. The swimming aid device of claim 13, wherein for each of the first fin and the second fin, the elongated key is formed on a perimeter of the fin blade and the groove is formed on a surface of the fin blade that is not on a perimeter of the fin blade.]

15. The swimming aid device of claim [14] *10*, wherein when the first side heel connector of one of the first and second fins is mated with the second side heel connector of the other of the first and second fins and the groove of one of the first and second fins is slidingly engaged with the elongated key of the other of the first and second fins, the elongated internal space of the first fin is angled toward the elongated internal space of the second fin.

[16. The swimming aid device of claim 12, wherein for each of the first fin and the second fin, the fin blade connector is a protruding hook and the fin blade connector receiver is an aperture extending through the fin blade.]

[17. The swimming aid device of claim 16, wherein for each of the first fin and the second fin, the elongated key is formed on a perimeter of the fin blade and the groove is formed on a surface of the fin blade that is not on a perimeter of the fin blade.]

[18. The swimming aid device of claim 10, wherein for each of the first fin and the second fin, the fin blade connector is an elongated key and the fin blade connector receiver is a groove.]

[19. A method of forming a monofin, the method comprising:

providing two identical swim fins, each fin comprising first and second fins made of resilient material, each of the first and second fins comprising:

an elongated internal space within a fin body, the elongated internal space sized to receive a portion of a swimmer's foot;

an opening leading to the elongated internal space, the opening sized to receive a swimmer's foot at the opening;

a fin blade coupled to and extending away from the elongated internal space;

a first side heel connector adjacent a first side of the opening leading to the elongated internal space;

a second side heel connector receiver adjacent a second side of the opening leading to the elongated internal space, wherein the first side heel connector and the second side heel connector are sized and shaped to mate with each other;

a fin blade connector on the fin blade;

a fin blade connector receiver on the fin blade;

matingly connecting the first side heel connector of the first fin to the second side heel connector of the second fin; and matingly connecting the fin blade connector of the first fin with the fin blade connector receiver of the second fin.]

[20. The method of claim 19, wherein matingly connecting the first side heel connector of the first fin to the second side heel connector of the second fin comprises coupling a hook connector of the first side heel connector to an eye receiver of the second side heel connector, and wherein matingly connecting the fin blade connector of the first fin with the fin blade connector receiver of the second fin comprises slidingly engaging an elongaged key of the fin blade connector with a groove of the fin blade connector receiver.]

*21. A swimming aid device comprising:*

*a pair of interlocking fins each configured to receive a respective foot of a wearer, wherein each of the interlocking fins comprises:*

*a male lock positioned on a lateral side of the fin; and*

*a female lock positioned on an opposing lateral side of the fin;*

*wherein the pair of interlocking fins are configured to interlock by mating engagement of the male lock of one interlocking fin with the female lock of the other interlocking fin,*

*wherein, the pair of interlocking fins are configured such that, when interlocked and worn by the wearer, the wearer's heels are angled away from each other.*

*22. The swimming aid device of claim 21, wherein the male and female lock are positioned on a distal portion of each of the interlocking fins.*

*23. The swimming aid device of claim 22, wherein the male and female lock extend less than half of a total length of each identical fin.*

*24. The swimming aid device of claim 21, wherein the male lock is on a perimeter edge of a fin blade of each of the interlocking fins.*

*25. The swimming aid device of claim 21, wherein a fin blade of one interlocking fin overlaps with the fin blade of the other interlocking fin in the interlocked configuration.*

*26. The swimming aid device of claim 21, wherein the male lock comprises an elongate key and the female lock comprises an elongate groove, and wherein the elongate groove of one interlocking fin is configured to slidably receive the elongate key of the other interlocking fin.*

*27. A swimming aid device, comprising:*

*a first fin made of resilient material;*

*a second fin made of resilient material;*

*wherein each of first fin and the second fin includes:*

*an elongated internal space within a fin body, the elongated internal space sized to receive a portion of a swimmer's foot;*

*an opening leading to the elongated internal space, the opening sized to receive a swimmer's foot at the opening;*

*a fin blade coupled to and extending away from the elongated internal space;*

*a first side heel connector adjacent a first side of the opening leading to the elongated internal space;*

*a second side heel connector receiver adjacent a second side of the opening leading to the elongated*

*internal space, wherein the first side heel connector and the second side heel connector are sized and shaped to mate with each other;*

*a fin blade connector on the fin blade; and*

*a fin blade connector receiver on the fin blade, wherein the fin blade connector and the fin blade connector receiver are sized and shaped to mate with each other;*

*wherein mating connection of the fin blade connector of the first fin with the fin blade connector receiver of the second fin, and mating connection of the first side heel connector of the first fin with the second side heel connector of the second fin forms a monofin of the first fin and the second fin;*

*wherein one of the first side heel connector and the second side heel connector is a hook and the other of the first side heel connector and the second side heel connector is a loop;*

*wherein for each of the first fin and the second fin, the fin blade connector is a protruding hook and the fin blade connector receiver is an aperture extending through the fin blade; and*

*wherein for each of the first fin and the second fin, the elongated key is formed on a perimeter of the fin blade and the groove is formed on a surface of the fin blade that is not on a perimeter of the fin blade.*

* * * * *